United States Patent
Sakuda et al.

(10) Patent No.: US 7,125,155 B2
(45) Date of Patent: Oct. 24, 2006

(54) LIGHTING DEVICE, AND LIQUID CRYSTAL DISPLAY DEVICE USING THE SAME

(75) Inventors: Yasushi Sakuda, Nomi-gun (JP); Toshihiko Ura, Nomi-gun (JP); Yoshinori Yasuda, Ishikawa-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 74 days.

(21) Appl. No.: 10/504,631

(22) PCT Filed: Feb. 12, 2003

(86) PCT No.: PCT/JP03/01422

§ 371 (c)(1),
(2), (4) Date: Jan. 19, 2005

(87) PCT Pub. No.: WO03/069220

PCT Pub. Date: Aug. 21, 2003

(65) Prior Publication Data

US 2005/0122744 A1    Jun. 9, 2005

(30) Foreign Application Priority Data

Feb. 12, 2002    (JP)    ............................. 2002-033327

(51) Int. Cl.
*F21V 7/04*    (2006.01)
(52) U.S. Cl. .................. 362/632; 362/633; 362/634
(58) Field of Classification Search .............. 362/632, 362/633, 634; 349/58, 61
See application file for complete search history.

(56) References Cited

U.S. PATENT DOCUMENTS 5,654,779 A * 8/1997 Nakayama et al. .......... 349/58

(Continued)

FOREIGN PATENT DOCUMENTS

JP    09-092017    4/1997

(Continued)

*Primary Examiner*—Sandra O'Shea
*Assistant Examiner*—James W Cranson, Jr.
(74) *Attorney, Agent, or Firm*—McDermott Will & Emery LLP

(57) ABSTRACT

In a lighting unit (UT1) of the present invention comprising a light guiding plate (3), casings (5, 6) covering at least a pair of side portions and a lower surface 3f of the light guiding plate so as to form a column-shaped light source unit storage space (103) along a side surface (3a) of one of the side portions, a reflecting sheet (4) disposed between the lower surface of the light guiding plate and a bottom surface of the casing such that an end (4a) thereof protrudes into the light source unit storage space, and a light source unit (L) inserted into the light source unit storage space and having a light source (1), a reflector (2), and a light source holding component (7), wherein the light source is bar-shaped and disposed along the side surface (3a) of the light guiding plate, the reflector is plate-shaped and encloses the side surface (3a) of the light guiding plate such that the light source is located inside thereof and one end thereof is located under the end (4a) of the reflecting sheet, and the light source holding component is disposed on the reflector for holding both the end portions of the light source, a structure (A) for inhibiting the end (2a) of the reflector from entering between the light guiding plate and the reflecting sheet when the light source unit is inserted into the light source unit storage space or for confirming whether or not the end of the reflector has entered is provided.

6 Claims, 9 Drawing Sheets

U.S. PATENT DOCUMENTS

| | | |
|---|---|---|
| 5,666,172 A | 9/1997 | Ida et al. |
| 5,886,759 A * | 3/1999 | Mashino et al. .............. 349/65 |
| 6,441,874 B1 * | 8/2002 | Saito et al. ................... 349/70 |

FOREIGN PATENT DOCUMENTS

| | | |
|---|---|---|
| JP | 10-170919 | 6/1998 |
| JP | 2001-291414 | 10/2001 |

* cited by examiner

LIGHTING DEVICE, AND LIQUID CRYSTAL DISPLAY DEVICE USING THE SAME

TECHNICAL FIELD

The present invention relates both to a lighting unit and to a liquid crystal display device using the same.

BACKGROUND ART

Since a liquid crystal display device is small and light, and consumes small electricity as compared to a Braun tube (cathode-ray tube), technologies of research, development, fabrication, and the like have rapidly made progress in recent years, and various liquid crystal display devices are commercialized and widely used.

FIG. 8 is a side view showing a liquid crystal display device LCD5 using a conventional lighting unit UT5, and FIG. 9 is an exploded perspective view of the lighting unit UT5. The conventional lighting unit UT5 comprises a fluorescent lamp 1 as a light source, a reflector 2 enclosing the fluorescent lamp 1 and configured to reflect light therefrom, a light guiding plate 3 disposed in the vicinity of the fluorescent lamp 1 for guiding the light therefrom, a reflecting sheet 4 disposed on a lower side of the light guiding plate 3 for reflecting the light, a housing 5 for holding these components from above and an outer peripheral side, and a rear surface cover 6 for holding the same from below. By disposing a liquid crystal display panel P on an emanating surface side of the lighting unit UT5, and by attaching a front side frame 8 or the like to the lighting unit UT5, the liquid crystal display device LCD5 is formed. In the liquid crystal display device LCD5 thus structured, a column-shaped light source unit storage space 103 is formed along a light-incident surface 3a of the light guiding plate 3 by means of the housing 5 and the rear surface cover 6, and a light source unit L to be described below is stored in the light source unit storage space 103. Reference numeral 102 denotes a clearance (exaggeratedly shown) formed between the reflector 2 and the housing 5. And, reference numeral 101 denotes another housing disposed so as to be opposed to the housing 5 for holding the light guiding plate 3 and the liquid crystal panel P.

The fluorescent lamp 1 as the light source is a fluorescent discharge tube such as a cold cathode tube. Rubber lamp holders 7, 7 are attached to both ends of the fluorescent lamp 1 and fixed to both ends of the reflector 2, and thereby the lamp 1 and the reflector 2 are integral with each other to form the light source unit L.

The light guiding plate 3 is a rectangular plate-shaped component made of transparent acrylic resin or the like for transmitting the light emitted from the fluorescent lamp 1 to an entire rear surface of the liquid crystal display panel P, and has the light-incident surface 3a corresponding to a side surface which the light from the fluorescent lamp 1 enters, two side surfaces 3b and 3c (not shown) both disposed adjacently to the light-incident surface 3a, an opposing light-incident surface 3d opposing to the light-incident surface 3a, an upper surface 3e, and a lower surface 3f.

The reflecting sheet 4 is a rectangular sheet disposed along the lower surface 3f of the light guiding plate 3 for reflecting the light emanating from the light guiding plate 3 into the same again. One end 4a of the reflecting sheet 4 on the fluorescent lamp 1 side protrudes from the light guiding plate 3.

The reflector 2 is a sheet folded in U-shape in cross-section and has a high reflectivity. One end 2a of the reflector 2 on a lower side is disposed between the end 4a of the reflecting sheet 4 on the fluorescent lamp 1 side and the rear surface cover 6, for holding the end 4a of the reflecting sheet 4 on the fluorescent lamp 1 side from below by means of the end 2a of the reflector 2.

When the lighting unit UT5 thus structured is assembled, the light source unit L is incorporated (inserted) into the light source unit storage space 103 through an insertion opening E in the direction of insertion (direction indicated by arrow in FIG. 9) and disposed on a predetermined portion, in a state in which the light guiding plate 3 and the reflecting sheet 4 are disposed between the housing 5 and the rear surface cover 6.

In a case where the light source unit L is replaced due to a defect, break, or the like, the light source unit L is taken out of or inserted through the insertion opening E in the same manner. The end 2a of the reflector 2 is disposed between the reflecting sheet 4 and the rear surface cover 6, and the end 4a of the reflecting sheet 4 on the light source side protrudes from the light guiding plate 3 in order to inhibit an abnormal emission of light in the vicinity of the light source.

In the above-described liquid crystal display device LCD5, the light emanating from the fluorescent lamp 1 is collected by the reflector 2, and guided within the light guiding plate 3 while being reflected by the reflecting sheet 4, and, an entire rear surface of the liquid crystal display panel P is irradiated therewith. Thereby, characters and images are visually recognized.

However, in the lighting unit UT5 thus structured, when the lighting unit UT5 is assembled or the light source unit L is replaced, the end 4a of the reflecting sheet 4 protruding toward the fluorescent lamp 1 contacts the lamp holder 7 and is pressed down, by incorporating (inserting) the light source unit L through the insertion opening E. So, a clearance is generated between the light guiding plate 3 and the reflecting sheet 4, and the end 2a of the reflector 2 may enter the clearance in some cases. And, there has been a problem that, when such lighting unit UT5 is used in the liquid crystal display device LCD5, a display portion corresponding to the end 2a of the reflector 2 is brighter than other display portions and display quality is deteriorated. Therefore, when using the conventional lighting unit UT5, it has been impossible to stably obtain a liquid crystal display device with high display quality. And, when the end 2a of the reflector 2 enters the clearance between the light guiding plate 3 and the reflecting sheet 4, there has been no means to confirm and inspect this, and a problem that the reflecting sheet 4 may come off downwardly (toward rear surface cover 6) has occurred.

DISCLOSURE OF THE INVENTION

An object of the present invention is to provide a lighting unit capable of inhibiting and confirming entry of an end of a reflector between a reflecting sheet and a light guiding plate, and a liquid crystal display device using the same.

And, in order to achieve the above-described object, a lighting unit according to the present invention comprises a light guiding plate, a casing covering at least a lower surface of the light guiding plate and a pair of side portions of the light guiding plate which are opposed to each other so as to form a light source unit storage space along a side surface of one of the side portions, a reflecting sheet disposed between the lower surface of the light guiding plate and a bottom surface of the casing such that an end thereof protrudes into the light source unit storage space, a light source unit inserted into the light source unit storage space and having a light source, a reflector, and a light source holding component, wherein the light source is disposed along the side surface of the light guiding plate, the reflector encloses the side surface of the light guiding plate such that the light source is located between the reflector and the side surface of the light guiding plate, and an end of the reflector is located under the reflecting sheet on the end side thereof, and the light source holding component is disposed on the reflector for holding both end portions of the light source, the lighting unit having a structure for inhibiting the end of the reflector from entering between the light guiding plate and the reflecting sheet when the light source unit is inserted into the light source unit storage space and/or for confirming whether or not the end of the reflector has entered. In such a configuration, it is possible to inhibit the end of the reflector from entering between the light guiding plate and the reflecting sheet or to confirm whether or not the end of the reflector has entered.

The structure may be formed by cutting a corner portion of the end of the reflecting sheet located in an opening of the light source unit storage space through which the light source unit is inserted. In such a configuration, by properly setting a size and a shape of the cut portion, the end of the reflector is located between the reflecting sheet and a bottom surface of a casing and thereby holds the reflecting sheet from below, and, the light source holding component is located on the end of the reflecting sheet, and in such a state, the light source unit is inserted, when the light source unit is inserted into the light source unit storage space through the opening. Therefore it is possible to inhibit the reflector from entering between the reflecting sheet and the light guiding plate.

The structure may be formed by providing a projection on a portion of the bottom surface of the casing which is located under a region at which the reflector and the reflecting sheet are superposed on each other.

The structure may be formed such that the reflecting sheet protrudes from a side surface of the light guiding plate which is adjacent to an opening of the light source unit storage space through which the light source unit is inserted, and is folded upward. In such a configuration, since the reflecting sheet is folded upward in the vicinity of the opening of the light source unit storage space, it is possible to inhibit the reflector from entering between the reflecting sheet and the light guiding plate when the light source unit is inserted.

The structure may be formed by providing a through-hole on a portion of a bottom portion of the casing which is located under a region at which the reflector and the reflecting sheet are superposed on each other. In such a configuration, it is possible to confirm whether or not the reflector and the reflecting sheet are disposed in a reverse order in a vertical direction through the through-hole.

In a liquid crystal display device according to the present invention, a liquid crystal display panel comprising a pair of substrates with liquid crystal interposed therebetween is disposed above a light guiding plate of a lighting unit according to any one of claims 1 to 5. In such a configuration, it is possible to obtain a liquid crystal display device using a lighting unit capable of inhibiting or confirming entry of the end of the reflector between the reflecting sheet and the light guiding plate.

The object, as well as other objects, features and advantages of the present invention will become more apparent from the following detailed description of the preferred embodiments taken with reference to the accompanying drawings.

BEST MODE FOR CARRYING OUT THE INVENTION

Hereinafter, embodiments of the present invention will be described with reference to the drawings.

(First Embodiment)

Figure 1:
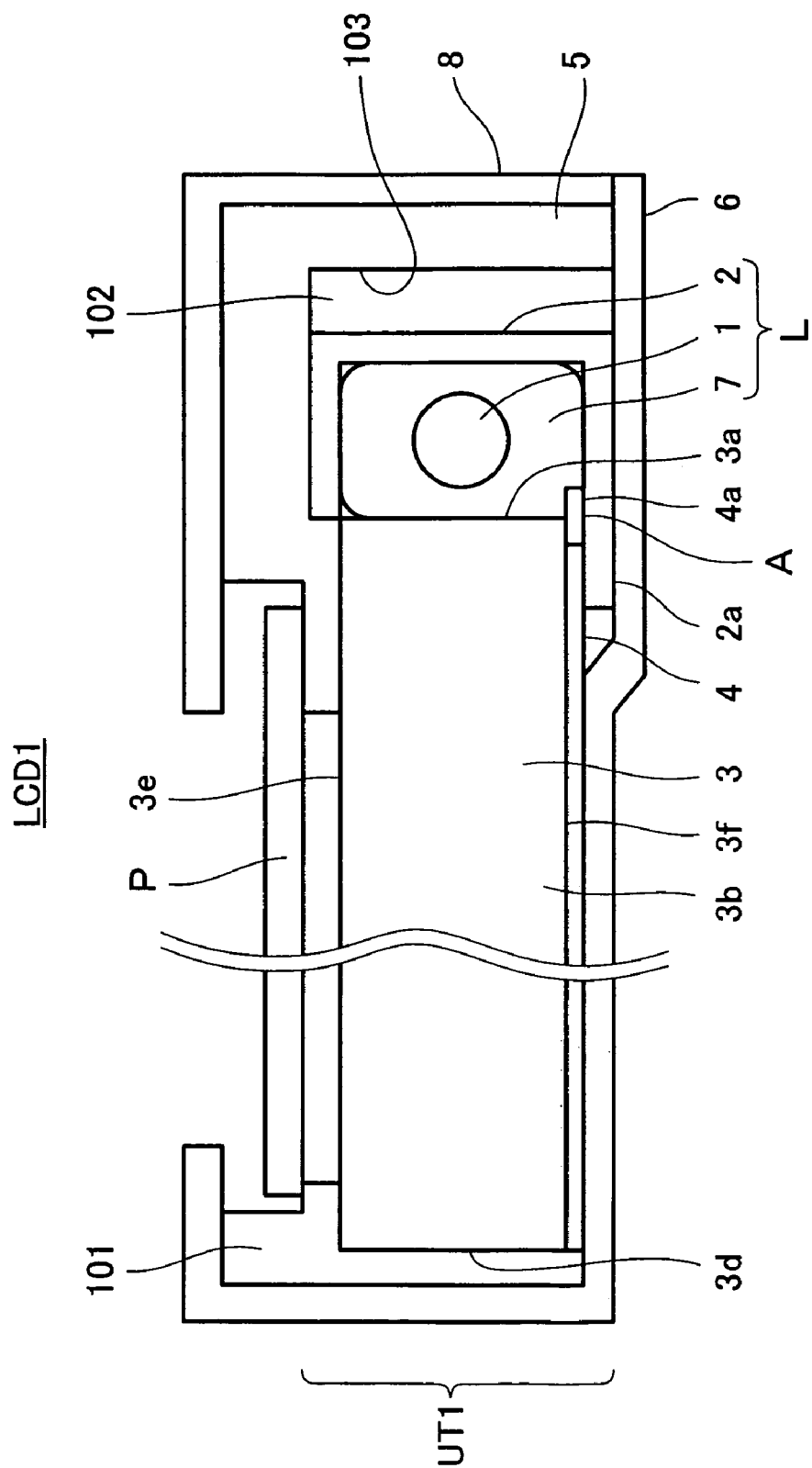
FIG. 1 is a side view showing a liquid crystal display device using a lighting unit according to a first embodiment of the present invention.
Figure 2:
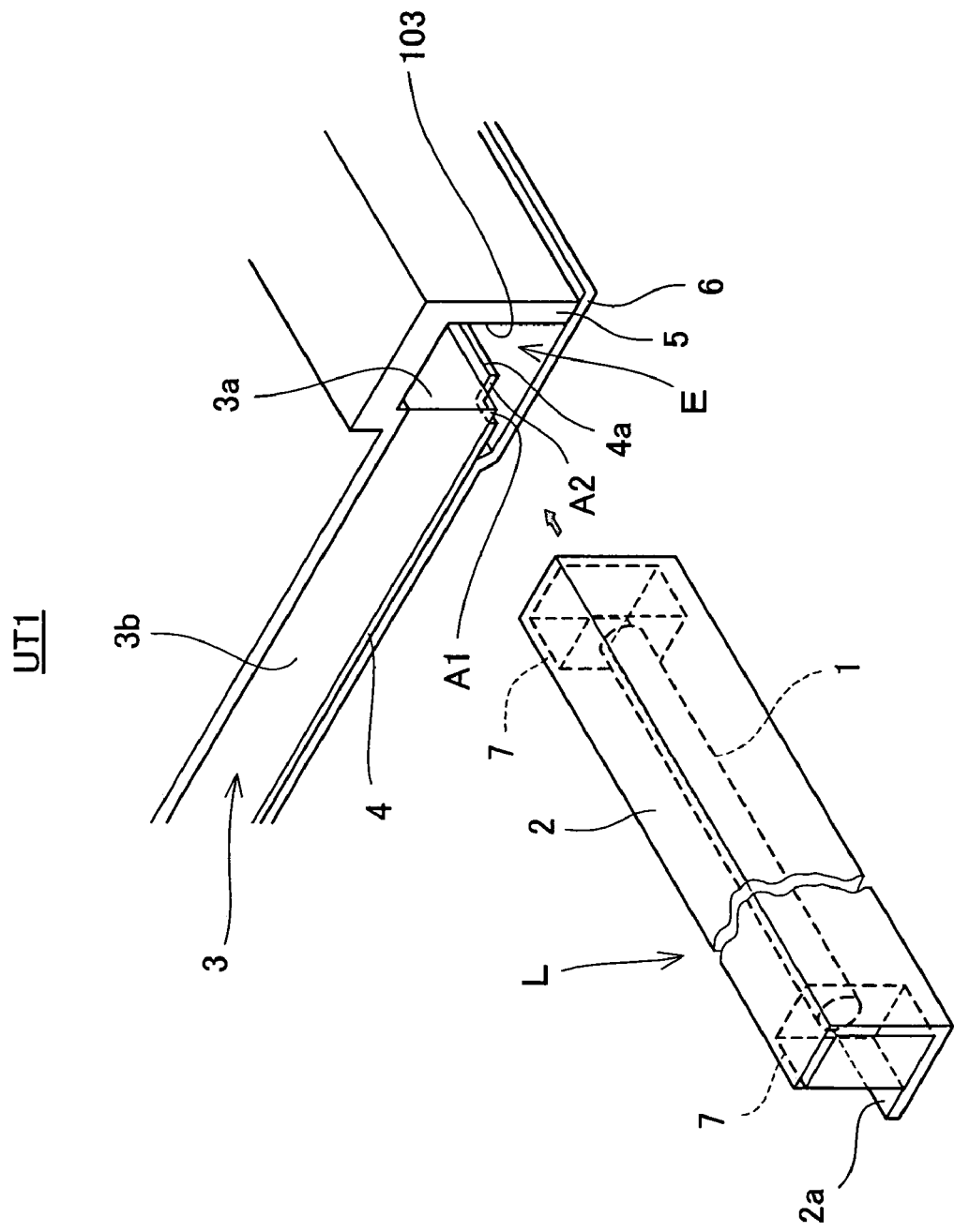
FIG. 2 is an exploded perspective view showing the lighting unit according to the first embodiment of the present invention.

FIG. 1 is a side view showing a liquid crystal display device LCD1 using a lighting unit UT1 according to a first embodiment of the present invention, and FIG. 2 is an exploded perspective view showing the lighting unit UT 1 in FIG. 1.

The lighting unit UT1 according to the present embodiment comprises a fluorescent lamp 1 which is a light source, a reflector 2 formed in U-shape in cross-section within which the fluorescent lamp 1 is disposed and configured to reflect light from the fluorescent lamp 1, a light guiding plate 3 having a light-incident surface 3a which the light from the fluorescent lamp 1 enters, two side surfaces 3b and 3c (not shown) both disposed adjacently to the light-incident surface 3a, an opposing light-incident surface 3d opposing to the light-incident surface 3a, an upper surface 3e, and a lower surface 3f, a reflecting sheet 4 disposed on the lower surface 3f of the light guiding plate 3 for reflecting the light, a housing 5 for holding these components from above and an outer peripheral side, and a rear surface cover 6 for holding the same from below. In the lighting unit UT1 thus structured, a column-shaped light source unit storage space 103 is formed along the light-incident surface 3a of the light guiding plate 3 by means of the housing 5 and the rear surface cover 6, and a light source unit L to be described below is stored within the light source unit storage space 103. Reference numeral 102 denotes a clearance formed between the reflector 2 and the housing 5. And, reference numeral 101 denotes another housing disposed so as to be opposed to the housing 5 for holding the light guiding plate 3 and a liquid crystal panel P. The housings 5 and 101, and the rear surface cover 6 form a casing.

The fluorescent lamp 1 which is a light source is a fluorescent discharge tube such as a bar-shaped cold cathode tube. Rubber lamp holders 7, 7 are attached to both ends of the fluorescent lamp 1. And, the lamp holders 7, 7 holding both the ends of the lamp 1 are fixed to both ends of the reflector 2, and thereby the fluorescent lamp 1 and the reflector 2 are integral with each other to form the light source unit L. And, the light source unit L is capable of being incorporated (inserted) into the light source unit storage space 103 through an insertion opening E.

The reflecting sheet 4 is a rectangular sheet formed by depositing silver or the like over a polyester film and having a high reflectivity. One end 4a of the reflecting sheet 4 on the fluorescent lamp 1 side protrudes into the light source unit storage space 103 more than the light guiding plate 3, and when the light source unit L is incorporated, one end 2a of the reflector 2 is disposed between the end 4a of the reflecting sheet 4 on the fluorescent lamp 1 side and the rear surface cover 6. By disposing the liquid crystal display panel P on an emanating surface side of (above) the lighting unit UT1, and by attaching a front side frame 8 and the like to the lighting unit UT1, the liquid crystal display device LCD1 is formed.

The reflecting sheet 4 is provided with a cut portion A obtained by cutting a predetermined region of a corner portion in the vicinity of the insertion opening E. Specifically, the cut portion A is L-shaped (rectangular in plan view), and one side A1 of the L-shaped cut portion A is parallel to the light-incident surface 3a of the light guiding plate 3, and the other side A2 thereof is parallel to the side surface 3b of the light guiding plate 3. A size of the L-shaped cut portion A is preferably such that the side A1 thereof does not contact the lamp holder 7 and is disposed on the reflector 2 when one end (right-side end in FIG. 2) of the light source unit L is inserted through the insertion opening E. In such a configuration, when the light source unit L is inserted into the light source unit storage space 103 through the insertion opening E, the end 2a of the reflector 2 is disposed between the reflecting sheet 4 and the rear surface cover 6 and thereby holds the reflecting sheet 4 from below, then the lamp holder 7 is disposed on the end 4a of the reflecting sheet 4, and in such a state, the light source unit L moves in the direction of insertion (direction indicated by arrow in FIG. 2) and is disposed on a predetermined portion. Therefore, it is possible to inhibit the reflector 2 from entering between the reflecting sheet 4 and the light guiding plate 3. The cut portion A may be provided such that the side A1 of the L-shaped cut portion A conforms to the light-incident surface 3a of the light guiding plate 3, and the cut portion A may have shapes other than L-shape.

(Second Embodiment)

Figure 3:
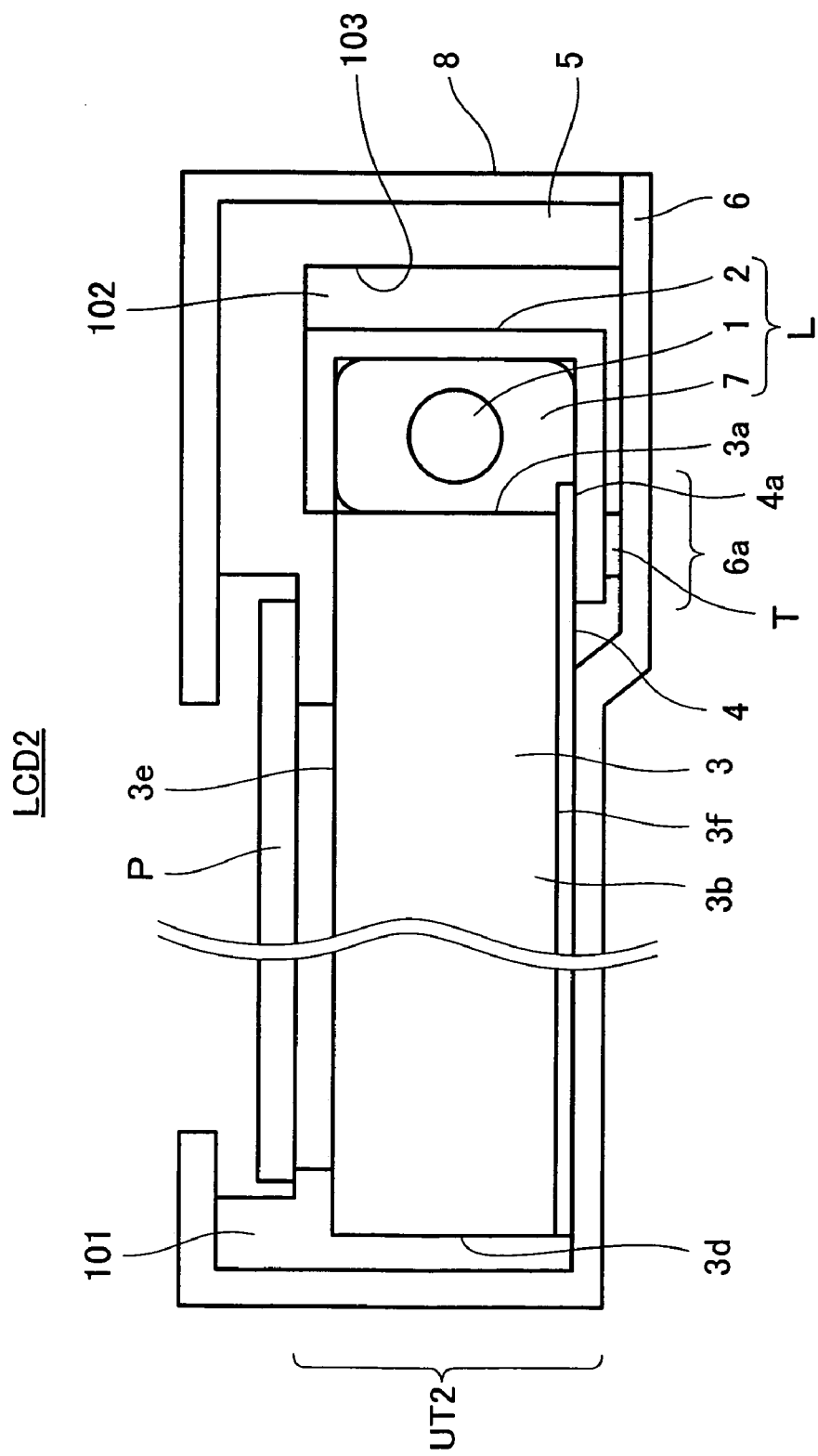
FIG. 3 is a side view showing a liquid crystal display device using a lighting unit according to a second embodiment of the present invention.

FIG. 3 is a side view showing a liquid crystal display device LCD2 using a lighting unit UT2 according to a second embodiment of the present invention. The rear surface cover 6 is provided with a projection T on a region 6a located under a region at which the reflecting sheet 4 and the reflector 2 are superposed on each other, for holding the reflecting sheet 4 and the reflector 2 from below. In the present embodiment, the rear surface cover 6 is made of resin, and the projection T is easily formed by resin molding. In such a configuration, since the reflecting sheet 4 and the reflector 2 can be held from below by means of the projection T, it is possible to inhibit the reflector 2 from entering between the reflecting sheet 4 and the light guiding plate 3.

(Third Embodiment)

Figure 4:
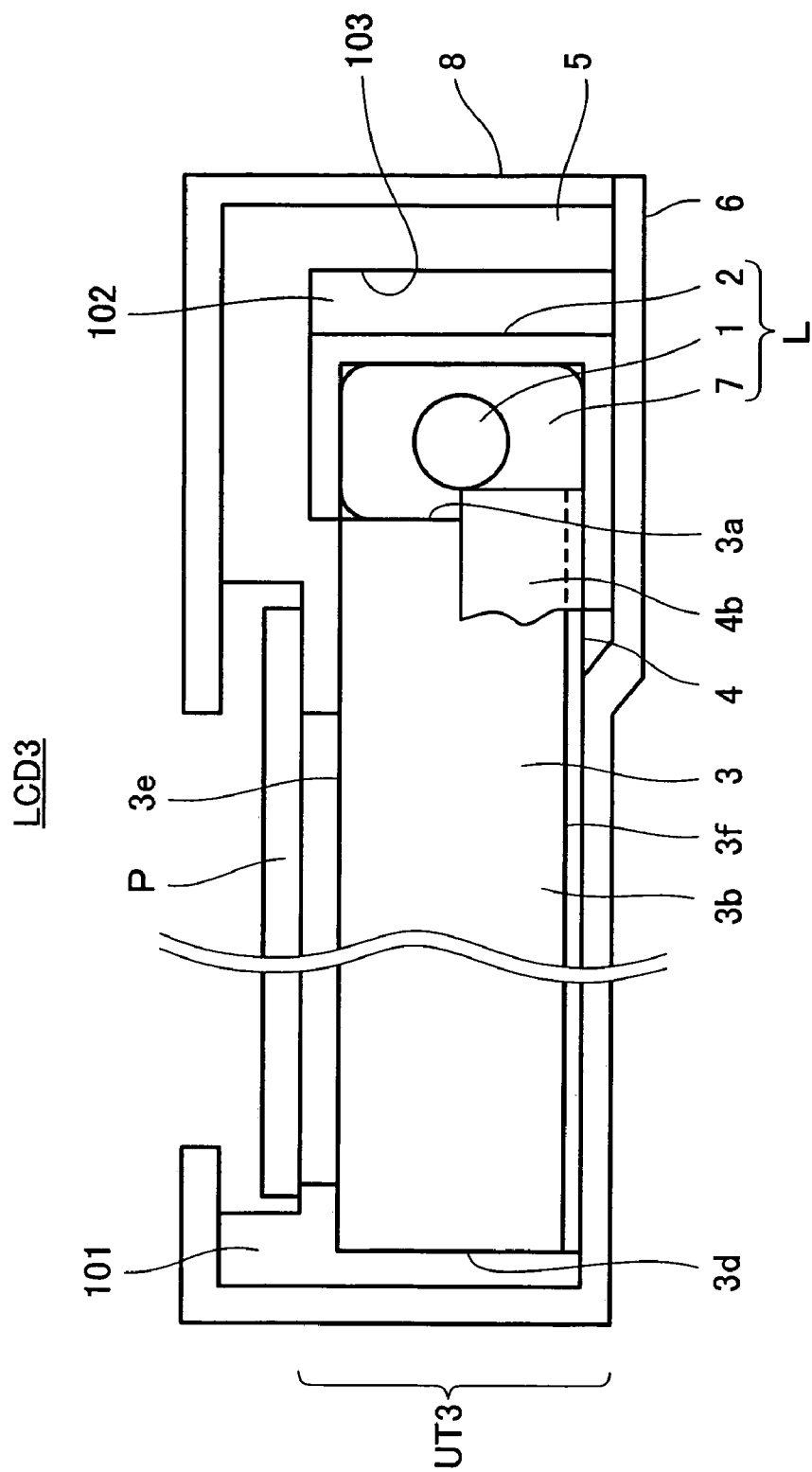
FIG. 4 is a side view showing a liquid crystal display device using a lighting unit according to a third embodiment of the present invention.
Figure 5:
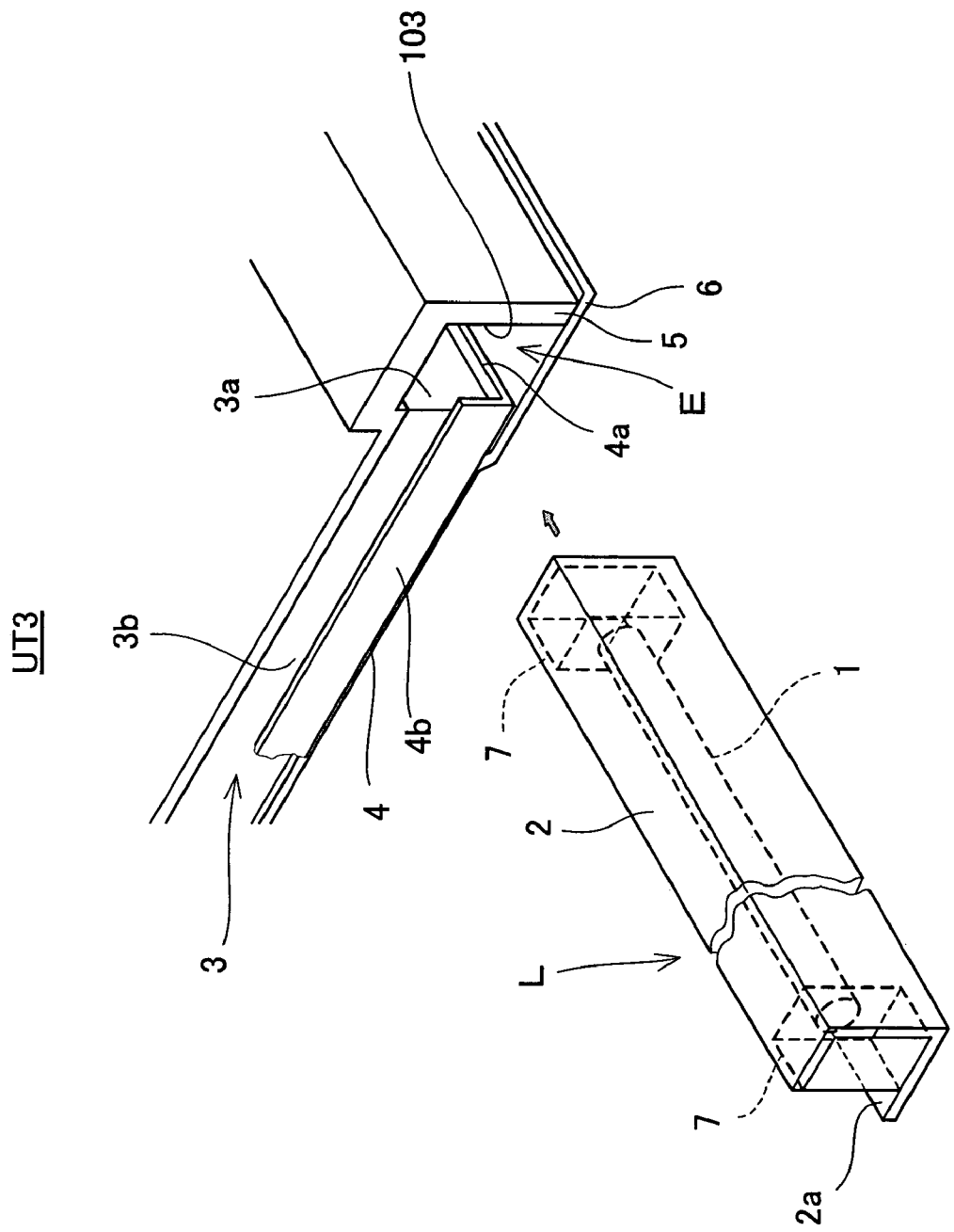
FIG. 5 is an exploded perspective view showing the lighting unit according to the third embodiment of the present invention.

FIG. 4 is a side view showing a liquid crystal display device LCD3 using a lighting unit UT3 according to a third embodiment of the present invention. FIG. 5 is an exploded perspective view showing the lighting unit UT3 in FIG. 4. The reflecting sheet 4 is folded such that an end portion 4b thereof protrudes from the light guiding plate 3 on the side surface 3b side in the vicinity of the insertion opening E, which is one of the two side surfaces 3b and 3c both disposed adjacently to the light-incident surface 3a, and the end portion 4b covers the side surface 3b of the light guiding plate 3. The end portion 4b of the reflecting sheet 4 covers a substantially lower half of the side surface 3b of the light guiding plate 3. By folding the end portion 4b of the reflecting sheet protruding on the side surface 3b side of the light guiding plate 3 in the vicinity of the insertion opening E so as to cover the side surface 3b, the end portion 4b closes a portion between the light guiding plate 3 and the reflecting sheet 4 as seen in the direction of insertion in which the light source unit L is inserted through the insertion opening E (direction indicated by arrow in FIG. 5). Therefore, it is possible to inhibit the reflector 2 from entering between the reflecting sheet 4 and the light guiding plate 3 when the light source unit L is incorporated. The end portion 4b of the reflecting sheet 4 is not intended to be limited to the configuration for covering the substantially lower half of the side surface 3b of the light guiding plate 3. Instead, this may be disposed so as to cover only a part in the vicinity of the insertion opening E of the side surface 3b of the light guiding plate 3, or so as to entirely cover the side surface 3b, for example.

(Forth Embodiment)

Figure 6:
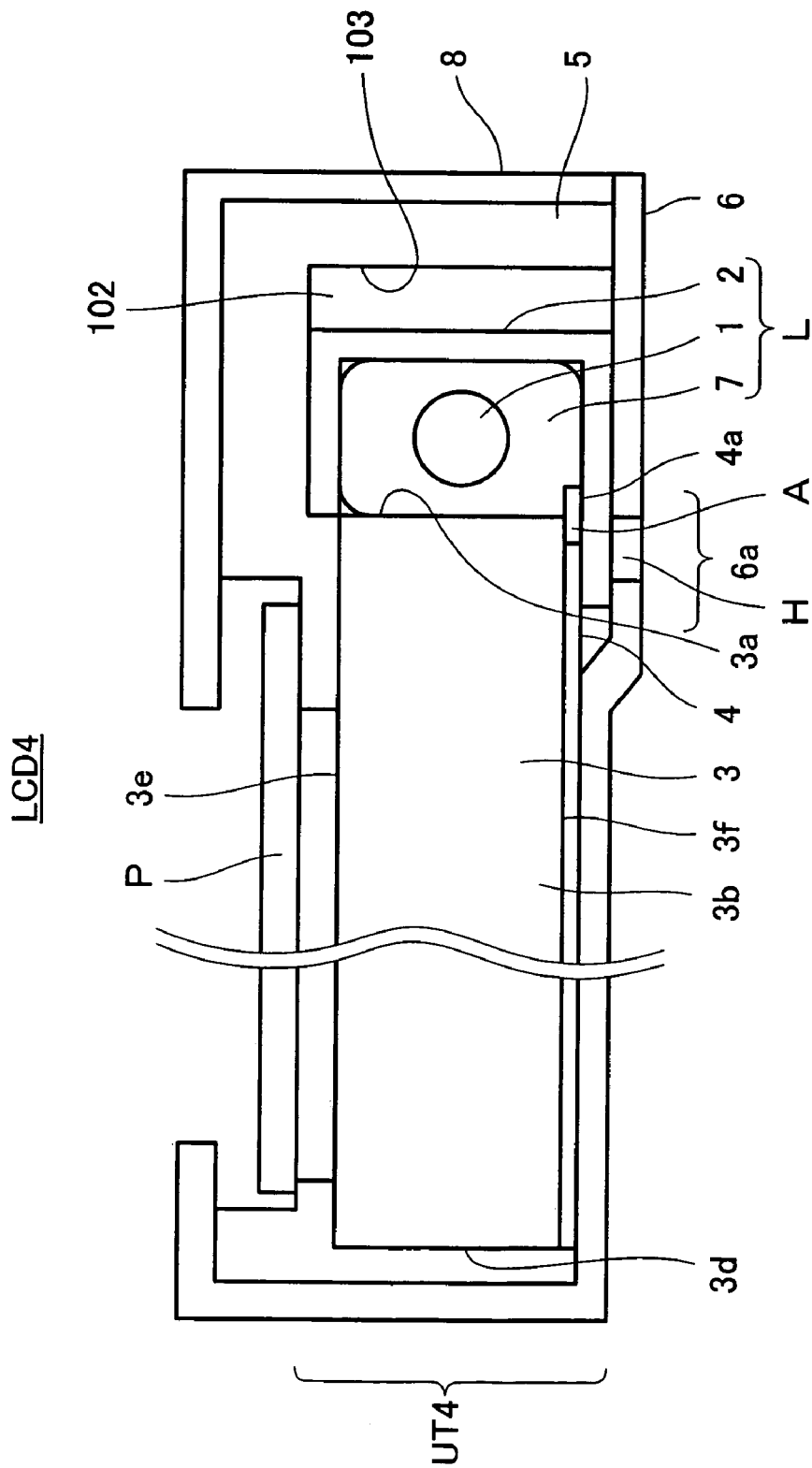
FIG. 6 is a side view showing a liquid crystal display device using a lighting unit according to a forth embodiment of the present invention.
Figure 7:
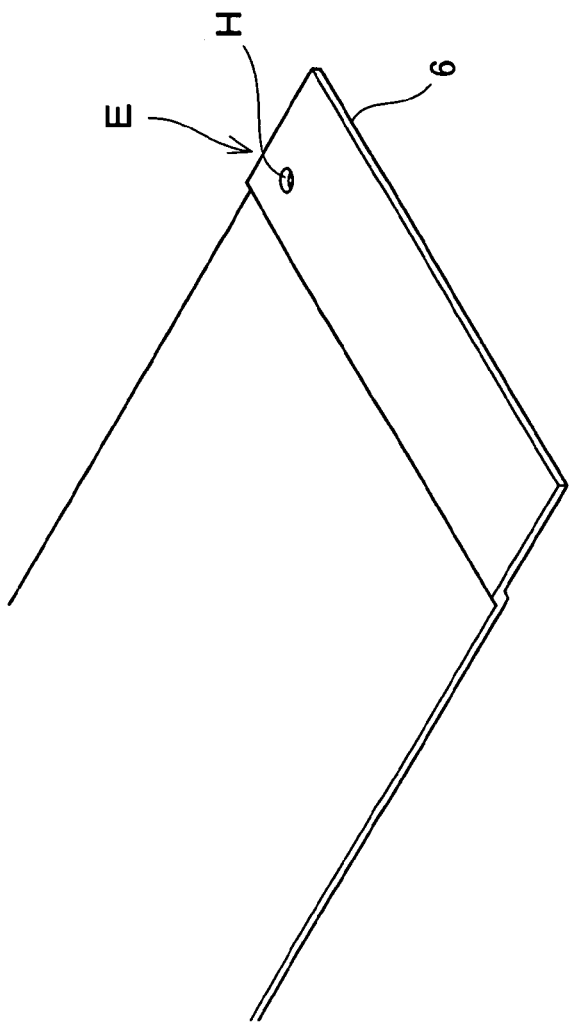
FIG. 7 is a rear view showing the lighting unit according to the forth embodiment of the present invention.
Figure 8:
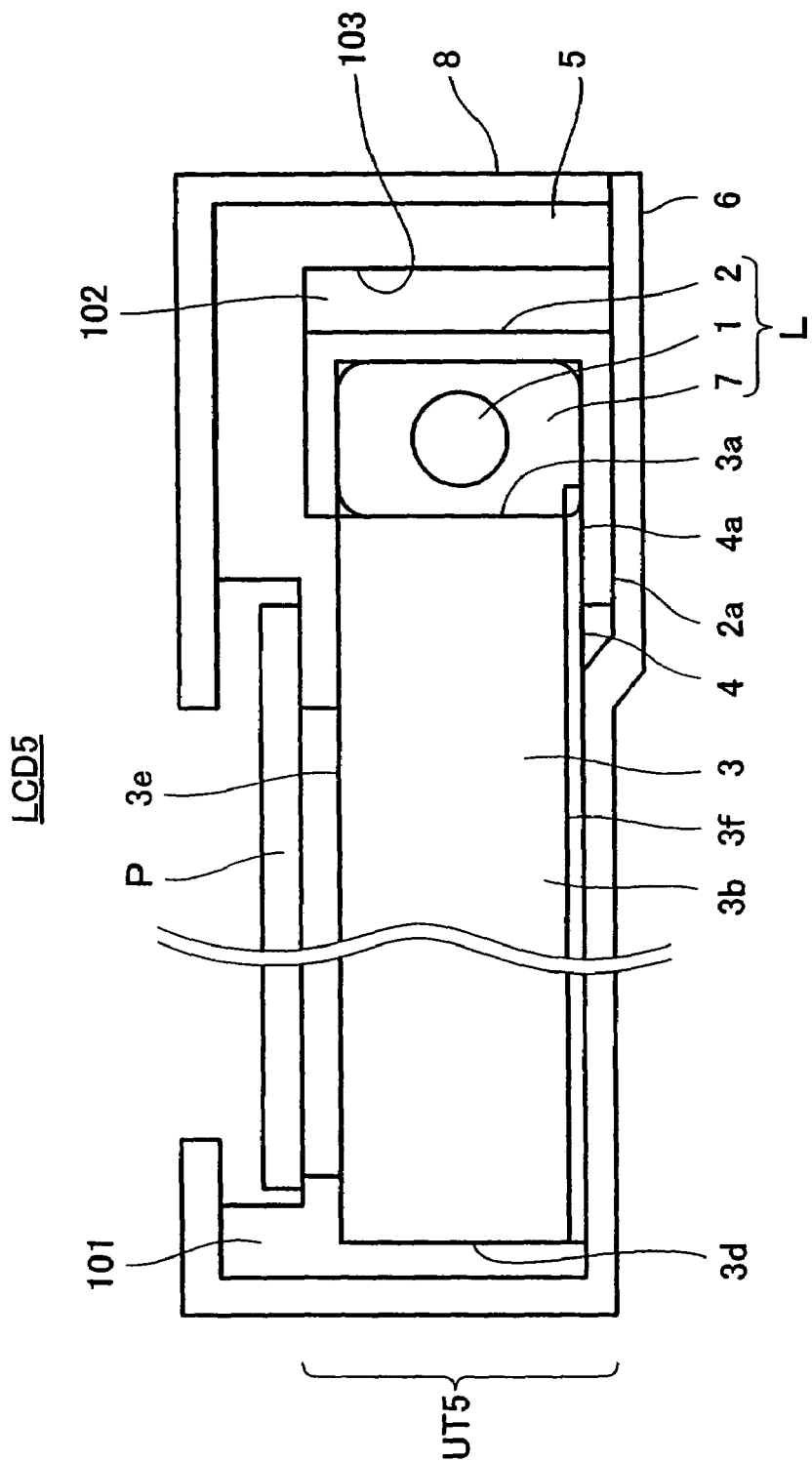
FIG. 8 is a side view showing a liquid crystal display device using a conventional lighting unit.
Figure 9:
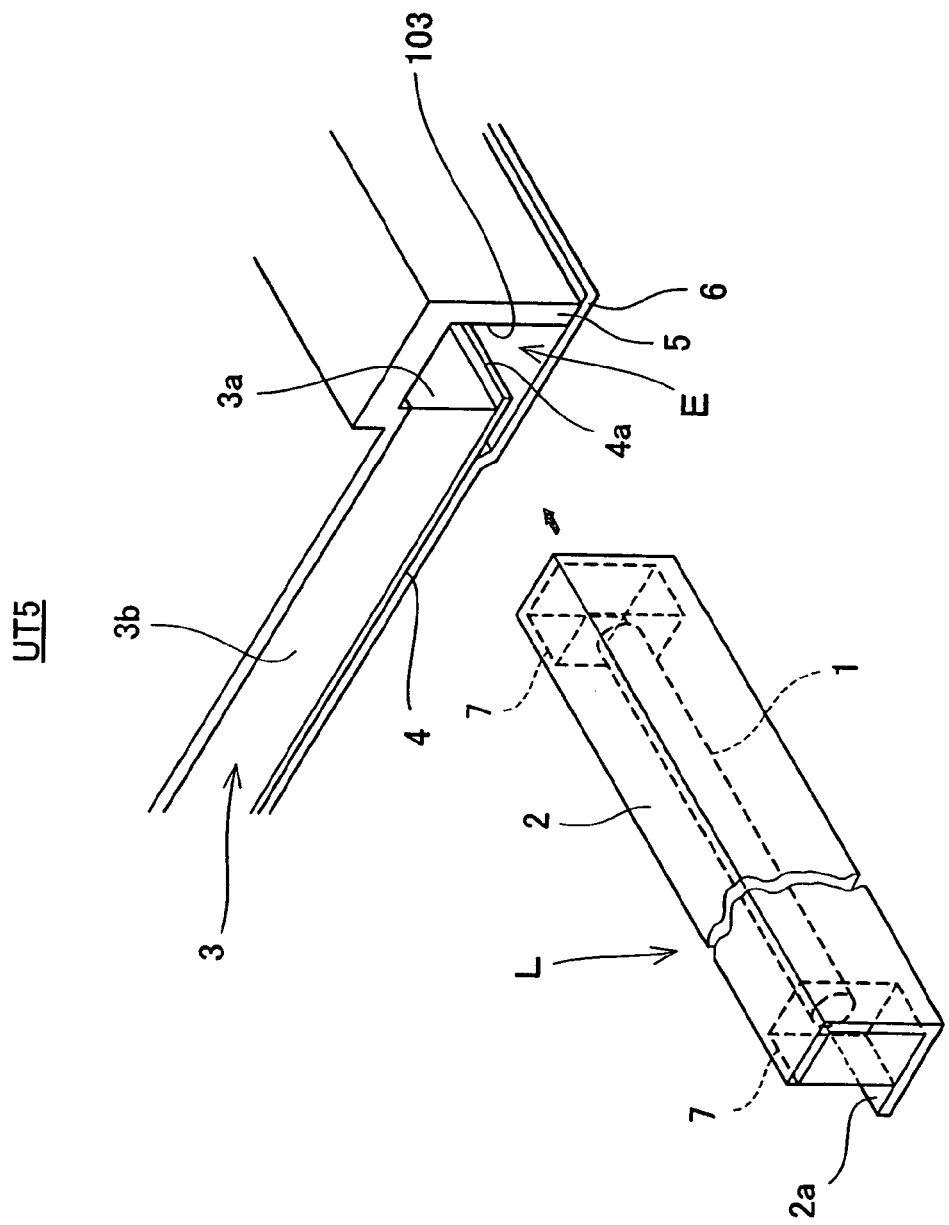
FIG. 9 is an exploded perspective view showing the conventional lighting unit.

FIG. 6 is a side view showing a liquid crystal display device LCD4 using a lighting unit UT4 according to a forth embodiment of the present invention. FIG. 7 is a rear view showing the lighting unit UT4 in FIG. 6. The lighting unit UT4 according to the present embodiment is obtained by providing a through-hole H on any of the lighting units UT1, UT2, and UT3 according to the above-described embodiments. FIG. 6 shows an example using the lighting unit UT1 according to the first embodiment. Alternatively, the through-hole H may also be provided on a conventional lighting unit UT5 shown in FIG. 8. The rear surface cover 6 is provided with the through-hole H penetrating the rear surface cover 6 in a thickness direction on the region 6a located under the region at which the reflecting sheet 4 and the reflector 2 are superposed on each other. The through-hole H is cylindrical and one through-hole H is disposed on the region 6a of the rear surface cover 6. The through-hole H may be in another shape, and, one or more holes may be provided. It is possible to check whether or not the reflector 2 enters between the reflecting sheet 4 and the light guiding plate 3 by visually inspecting an inside through the through-hole H, after inserting the light source unit L through the insertion opening E and disposing the same on a predetermined portion. That is to say, if the reflector 2 is seen through the through-hole H, the end 2a of the reflector 2 is disposed on a correct portion (between the reflecting sheet 4 and the rear surface cover 6), whereas, if the reflecting sheet 4 is seen through the through-hole H, the end 2a of the reflector 2 enters an incorrect portion (between the light guiding plate 3 and the reflecting sheet 4). Therefore, by using any of the lighting units UT1, UT2, and UT3 according to the above-described embodiments, it is possible to structurally inhibit the reflector from entering between the reflecting sheet and the light guiding plate, and by providing the through-hole H on these lighting units UT1, UT2, and UT3 and visually inspecting the same through the through-hole H, reliability concerning placement of the end 2a of the reflector 2 can be improved.

(Application to a Liquid Crystal Display Device)

By disposing the liquid crystal display panel P on an emanating surface side of (above) the lighting units UT1 to UT4, and by attaching the front side frame 8 formed by a metal frame or the like to these units UT1 to UT4, the liquid crystal display devices LCD1 to LCD4 are formed (see FIGS. 1, 3, 4, and 6). The liquid crystal display panel P is configured to display characters and images, and comprises the liquid crystal display panel P structured such that a pair of transparent substrates provided with display electrodes are disposed to be opposed to each other with an appropriate spacing and bonded to each other, and a liquid crystal material is filled in the spacing with an inlet sealed by a sealing material, a plurality of driving circuits disposed on a periphery of the liquid crystal display panel P and configured to allow the liquid crystal display panel P to display images or the like, a substrate on which the driving circuits are mounted, and the like. By using the lighting units UT1 to UT3 in the liquid crystal display device LCD, the reflector is structurally inhibited from entering between the reflecting sheet and the light guiding plate. And, by using the lighting unit UT4 in which the through-hole H is provided on the rear surface cover 6 of the lighting units UT1 to UT3, it is possible to further improve reliability thereof by visual inspection through the through-hole H. Therefore, it is possible to inhibit occurrence of problem that a display portion of the liquid crystal panel P corresponding to the end 2a of the reflector 2 becomes brighter than other display portions by entry of the end 2a of the reflector 2 between the reflecting sheet 4 and the light guiding plate 3, and to stably obtain a liquid crystal display device with a high display quality.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention.

INDUSTRIAL APPLICABILITY

A lighting unit according to the present invention is useful as a lighting unit of a liquid crystal display device.

A liquid crystal display device according to the present invention is useful as a thin display device used in a notebook-type personal computer or the like.

The invention claimed is:

1. A lighting unit comprising:
a light guiding plate;
a casing covering at least a lower surface of the light guiding plate and a pair of side portions of the light guiding plate which are opposed to each other so as to form a light source unit storage space along a side surface of one of the side portions;
a reflecting sheet disposed between the lower surface of the light guiding plate and a bottom surface of the casing such that an end thereof protrudes into the light source unit storage space; and
a light source unit inserted into the light source unit storage space and having a light source, a reflector, and a light source holding component, wherein
the light source is disposed along the side surface of the light guiding plate, the reflector encloses the side surface of the light guiding plate such that the light source is located between the reflector and the side surface of the light guiding plate, and an end of the reflector is located under the reflecting sheet on the end side thereof, and the light source holding component is disposed on the reflector for holding both end portions of the light source,
the reflecting sheet is formed so as to guide the end of the reflector in between the reflecting sheet and the casing when the light source unit is inserted into the light source unit storage space.

2. The lighting unit according to claim 1, wherein
the reflecting sheet is formed by cutting a corner portion of the end of the reflecting sheet located in an opening of the light source unit storage space through which the light source unit is inserted.

3. A lighting unit comprising:
a light guiding plate;
a casing covering at least a lower surface of the light guiding plate and a pair of side portions of the light guiding plate which are opposed to each other so as to form a light source unit storage space along a side surface of one of the side portions;
a reflecting sheet disposed between the lower surface of the light guiding plate and a bottom surface of the casing such that an end thereof protrudes into the light source unit storage space; and
a light source unit inserted into the light source unit storage space and having a light source, a reflector, and a light source holding component, wherein
the light source is disposed along the side surface of the light guiding plate, the reflector encloses the side surface of the light guiding plate such that the light source is located between the reflector and the side surface of the light guiding plate, and an end of the reflector is located under the reflecting sheet on the end side thereof, and the light source holding component is disposed on the reflector for holding both end portions of the light source,
the lighting unit further comprising a projection provided on a portion of the bottom surface of the casing which is located under a region at which the reflector and the reflecting sheet are superposed on each other.

4. The lighting unit according to claim 1 wherein,
the reflecting sheet protrudes from a side surface of the light guiding plate which is adjacent to an opening of the light source unit storage space through which the light source unit is inserted, and is folded upward.

5. A lighting unit comprising:
a light guiding plate;
a casing covering at least a lower surface of the light guiding plate and a pair of side portions of the light guiding plate which are opposed to each other so as to form a light source unit storage space along a side surface of one of the side portions;
a reflecting sheet disposed between the lower surface of the light guiding plate and a bottom surface of the casing such that an end thereof protrudes into the light source unit storage space; and
a light source unit inserted into the light source unit storage space and having a light source, a reflector, and a light source holding component, wherein
the light source is disposed along the side surface of the light guiding plate, the reflector encloses the side surface of the light guiding plate such that the light source is located between the reflector and the side surface of the light guiding plate, and an end of the reflector is located under the reflecting sheet on the end side thereof, and the light source holding component is disposed on the reflector for holding both end portions of the light source the lighting unit further comprising a through-hole provided on a portion of a bottom portion of the casing which is located under a region at which the reflector and the reflecting sheet are superposed on each other.

6. A liquid crystal display device wherein a liquid crystal display panel comprising a pair of substrates with liquid crystal interposed therebetween is disposed above a light guiding plate of a lighting unit according to any one of claims 1 to 5.

* * * * *